United States Patent
Malhotra et al.

(10) Patent No.: US 9,462,525 B1
(45) Date of Patent: Oct. 4, 2016

(54) DYNAMIC MANAGEMENT AND USE OF BEARERS FOR MEDIA COMMUNICATION

(71) Applicant: Sprint Spectrum L.P., Overland Park, KS (US)

(72) Inventors: Rajil Malhotra, Olathe, KS (US); Asfaw Negeri, Leawood, KS (US); Ashish Bhan, Shawnee, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 188 days.

(21) Appl. No.: 14/335,493

(22) Filed: Jul. 18, 2014

(51) Int. Cl.
*H04W 76/02* (2009.01)
*H04W 36/16* (2009.01)
*H04W 88/16* (2009.01)
*H04W 28/08* (2009.01)

(52) U.S. Cl.
CPC ......... *H04W 36/165* (2013.01); *H04W 28/085* (2013.01); *H04W 76/025* (2013.01); *H04W 88/16* (2013.01)

(58) Field of Classification Search
CPC ........... H04W 28/085; H04W 76/025; H04W 84/045
See application file for complete search history.

(56) References Cited

U.S. PATENT DOCUMENTS

| 2010/0039993 | A1* | 2/2010 | Ramankutty | H04W 88/16 370/328 |
| 2012/0093167 | A1* | 4/2012 | Velandy | H04W 76/00 370/401 |
| 2013/0132594 | A1* | 5/2013 | Boeszoermenyi | H04W 76/022 709/228 |
| 2015/0148046 | A1* | 5/2015 | Lim | H04W 36/22 455/444 |
| 2015/0365867 | A1* | 12/2015 | Worrall | H04W 28/085 455/410 |
| 2016/0057178 | A1* | 2/2016 | Noldus | H04L 65/1016 709/228 |

OTHER PUBLICATIONS

Noldus et al., Multi-access for the IMS network, Ericsson Review No. 2, 2008, p. 81-86.*

* cited by examiner

*Primary Examiner* — Hoon J Chung

(57) ABSTRACT

When a UE has a first bearer with a gateway via a first base station and the UE engages in session setup signaling with a session server via that first bearer to set up a media session, the network may establish for the UE a second bearer via a second base station, and may the second bearer for communication of media content of the session while using the first bearer for communication control signaling for the session. In practice, the first base station could be a macro base station that operates on licensed frequency spectrum, while the second base station could be a small cell that operates on unlicensed frequency spectrum. The disclosed process can thereby help to offload communication of session content to be via the small cell instead of via the macro base station, while maintaining session control signaling to be via the macro base station.

18 Claims, 7 Drawing Sheets

DYNAMIC MANAGEMENT AND USE OF BEARERS FOR MEDIA COMMUNICATION

BACKGROUND

Unless otherwise indicated herein, the information described in this section is not prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more packet data network gateways (PGWs) or similar components that provide connectivity with a packet-switched network so as to support various communication services. For instance, the infrastructure may include gateways that support general packet-data communications, such as general web browsing, file transfer, and the like, and/or packet-based real-time media communications such as voice over Internet Protocol (VoIP) and streaming media for instance.

A representative PGW may sit as a node on a wireless service provider's private packet-switched network and may thus provide connectivity with various application servers and other entities on that private network, and with other such entities accessible through a connection between the service provider's network and one or more other networks such as the public Internet. By way of example, such a PGW may provide connectivity with an Internet Multimedia Subsystem (IMS) platform or other session server that supports VoIP calling and/or other such media services.

When a UE first enters into the coverage of cellular wireless network, the UE engages in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as a mobility management entity (MME). Upon authenticating and authorizing the UE, the network controller may then engage in further signaling with the base station and with a serving gateway (SGW), which may in turn engage in signaling with a PGW, ultimately resulting in setup of one or more bearer connections or "bearers" each extending, via the base station, between the UE and the PGW. In particular, each such bearer may essentially define a logical communication tunnel that includes a radio bearer portion extending between the UE and the base station, and an access bearer portion extending between the base station and the PGW via the SGW. Further, for each bearer or group of bearers, the PGW may assign an Internet Protocol (IP) address to the UE, and the PGW and other entities in the bearer path may reserve various resources to facilitate carrying packet-data communications to and from the UE.

A network such as this may initially establish for a UE one or more default bearers to enable the UE to engage in certain basic communications, with each default bearer having an designated quality of service level, such as maximum bit rate and other attributes, for instance. By way of example, the network may initially establish for the UE a default Internet bearer for use by the UE to engage in general Internet communications such as web browsing, e-mail messaging, and other "best efforts" data communication. Further, if the UE subscribes to VoIP service or another such service that would be served by an IMS, the network may initially establish for the UE a default IMS signaling bearer connection for use by the UE to engage in session setup signaling, such as Session Initiation Protocol (SIP) signaling, with the IMS for setup of VoIP calls or the like.

Further, as the UE is served by the network, the network may establish for the UE additional bearers as needed. For example, if the UE has an IMS signaling bearer and the UE engages in signaling over that bearer with an IMS to set up a packet-based real-time media session, the network may then establish for the UE a dedicated IMS bearer for carrying media content of the session, such as VoIP packets, to and from the UE. To facilitate a desired quality of service level for such a media session, the network may make reserve sufficient network resources along the dedicated IMS bearer path to help provide a sufficient bit rate, routing priority, and the like. Once the dedicated IMS bearer is established, the UE may then send and receive media content of the session over the dedicated IMS bearer, while engaging in further control signaling (such as SIP signaling) for the session over the IMS signaling bearer.

Overview

With advances in cellular network technology and increased use of VoIP and other packet-based real-time media services, cellular network resources may begin to be strained. For instance, the increasing number of dedicated IMS bearers that may be assigned for such communications may consume an increasing extent of network resources, particularly limited air interface resources, and may thereby leave reduced resources available to serve other communications. As a result, UEs may begin to experience decreased quality of service, which is undesirable.

Disclosed herein is a method and system to help address this issue. In accordance with the disclosure, when a UE has a first bearer with a PGW via a first base station and the UE engages in session setup signaling with a session server via that first bearer to set up a VoIP call or other media session, the method involves establishing for the UE a second bearer via a second base station, and using the second bearer for communication of media content of the session but using the first bearer for communication control signaling for the session. In practice, the first base station could be a macro base station that operates on licensed frequency spectrum, while the second base station could be a small cell base station ("small cell"), such as a femtocell or other small scale base station, that operates on unlicensed frequency spectrum. In such an arrangement, by offloading communication of media content of the session to be via the small cell instead of via the macro base station, the service provider may thereby conserve its licensed frequency spectrum. Meanwhile, by maintaining communication of control signaling for the session to be via the macro base station, the service provider may maintain control over the session signaling, to help ensure desired quality of service and to facilitate handover as a UE moves between coverage areas.

Accordingly, in one respect, disclosed herein is a method for managing and use of bearer connections for media communication. As disclosed, the method involves establishing a first bearer connection between a UE and a PGW via a first base station and first air interface, the PGW providing connectivity with a session server. Further, the method involves conveying, via the first bearer connection, session setup signaling between the UE and the session server, for setting up a media session between the UE and the session server. In addition, the method involves establishing a second bearer connection between the UE and the PGW via a second base station and second air interface. And the method involves using the second bearer connection rather than the first bearer connection for communication between the UE and the session server of media content of the media session, while using the first bearer connection rather than the second bearer connection for communication between the UE and the session server of control signaling for the media session between.

By way of example, this method could be used with respect to VoIP service provided by an IMS and in a system where the first base station is a macro base station that operates on licensed frequency spectrum and the second base station is a small cell that operates on unlicensed frequency spectrum. In such an arrangement, the UE could have an IMS signaling bearer established via the macro base station but the UE could report to the network that it is within coverage of the small cell and, with network approval. When the UE then engages in SIP signaling with the IMS via the IMS signaling bearer to set up a VoIP call, the PGW may receive a signal indicating that the VoIP call is being set up, and the PGW may responsively engage in a network-initiated attach process to establish for the UE a dedicated IMS bearer via the small cell, while maintaining the IMS signaling bearer with the UE via the macro base station. The UE may then engage in VoIP communication over the dedicated IMS bearer via the small cell rather via the macro base station, thus helping to conserve licensed frequency spectrum at the macro base station. However, the UE may engage in further control signaling, such as further SIP signaling, for the VoIP call over the IMS signaling bearer via the macro base station, thus helping to allow the service provider to maintain control over the VoIP call.

In another respect, disclosed herein is method with functions carried out by a PGW or the like that provides connectivity with a session server, in a scenario where the PGW has a has a first bearer connection with a UE via a first base station serving the UE. In accordance with the method, the PGW receives notification that the UE is within coverage of a second base station and the PGW responsively stored an indication that the UE is accessible via the second base station. Further, the PGW receives a signal indicating setup of a media session between the UE and the session server, in a scenario where control signaling for the media session flows between the session server and the UE via the PGW and the first bearer connection. And in response to the signal indicating setup of the media session, and based on the stored indication that the UE is accessible via the second base station, the PGW then causes to be established a second bearer connection between the PGW and the UE via the second base station, for carrying media content of the media session between the session server and the UE, while retaining the first bearer connection via the first base station for carrying the control signaling for the media session between the session server and the UE.

In line with the discussion above, media content of the media session may thus flow between the session server and the UE via the second bearer connection rather than via the first bearer connection, but the control signaling for the media session may flow between the session server and the UE via the first bearer connection rather than via the second bearer connection. Consequently, this arrangement could help conserve resources at the first base station, while maintaining control over session signaling via the first base station.

Still further, disclosed herein is a PGW having at least one network interface through which the PGW engages in network communication, wherein the PGW provides connectivity with an IMS, and having a controller configured to carry out the various functions when the PGW has an established IMS signaling bearer extending between the PGW and a UE via a first base station serving the UE. As disclosed, the functions include determining that the UE is also within coverage of a second base station and that a media session is being set up between the UE and the IMS. Further, the functions include, responsive to the determining, causing to be established for the media session a dedicated IMS bearer between the PGW and the UE via the second base station, such that media content for the media session would then flow between the UE and the IMS via the second bearer rather than via the first bearer, but control signaling for the media session would flow between the UE and the IMS via the first bearer rather than via the second bearer.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
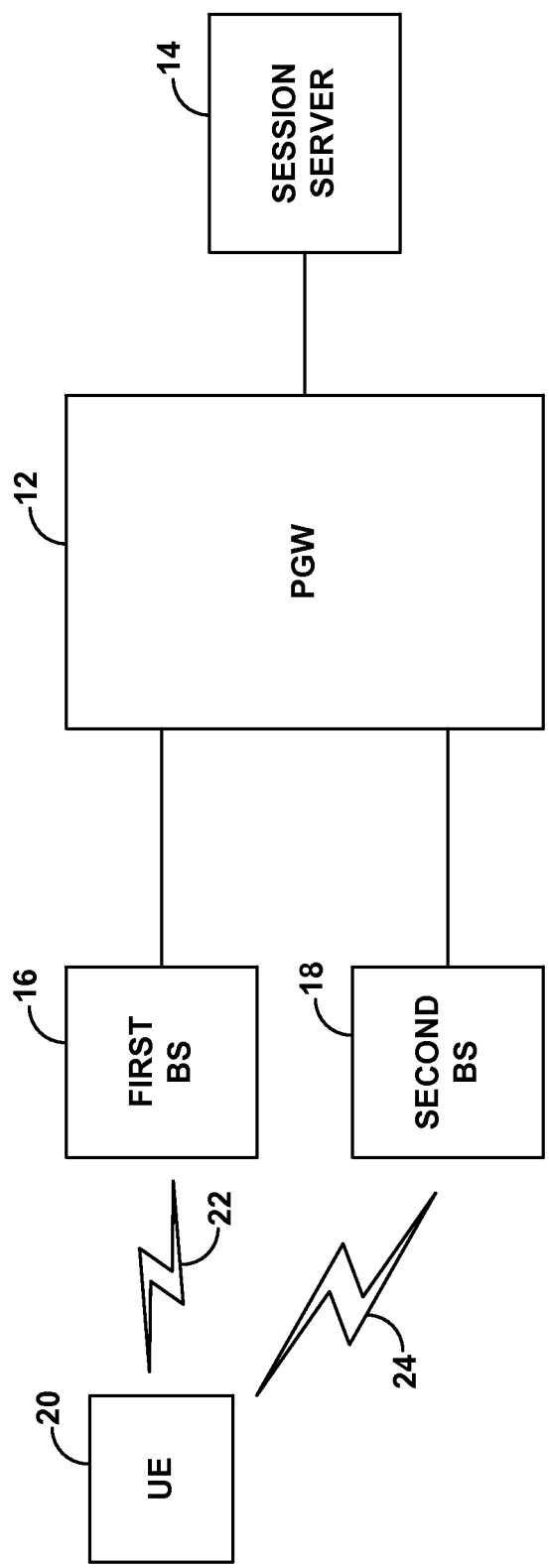
FIG. 1 is a simplified block diagram of an example network arrangement in which features of the present disclosure can be implemented.

Referring to the drawings, as noted above, FIG. 1 is a simplified block diagram of an example network arrangement in which the features of the present disclosure can be implemented. As shown in FIG. 1, the example network arrangement includes a PGW 12 that provides connectivity with a session server 14 such as an IMS platform for instance. Further, the PGW is shown being in communication with a first base station 16 and with a second base station 18.

In the figure, the solid lines shown connecting these entities represent any direct or indirect communication paths, whether packet-switched, circuit-switched, wired, and/or wireless, and including any of a variety of other nodes and links. By way of example, the PGW, base stations, and session server could all sit on a service provider's private packet-data network, in which case the solid lines could represent packet-switched interfaces over that network. As another example, the base stations could each be coupled with the PGW by direct trunks, and/or the PGW could be coupled with the session server by a direct trunk. Other arrangements are possible as well.

In practice, base stations 16 and 18 may take any of a variety of forms. By way of example, as discussed above, one base station (e.g., base station 16) could be a macro base station that provides service on a licensed frequency spectrum, and the other base station (e.g., base station 18) could be a small cell that provides service on an unlicensed frequency spectrum. Alternatively, both base stations could be macro base stations or small cells, and either base station could operate on licensed and/or unlicensed frequency spectrum. Regardless, each base station would include a transceiver and an antenna structure that radiates to define at least one wireless coverage area in which to serve UEs, such as a representative UE 20 as shown.

As shown, UE 20 and base station 16 communicate with each other over a first air interface 22, and UE 20 and base station 18 communicate with each other over a second air interface 24. In practice, the communication over each of these air interfaces may be in accordance with an agreed air interface protocol or radio access technology, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed. Further, the same or different air interface protocols could be used over the two illustrated air interfaces 22, 24.

In this simplified arrangement, the UE may initially detect that it is within coverage of just the first base station 16 (e.g., a macro base station) and may responsively engage in an attach process with that base station. In line with the discussion above, for instance, the UE may transmit an attach request message over air interface 22 to base station 16, which may cause the network to authenticate the UE and to establish one or more bearers for the UE.

Figure 2:
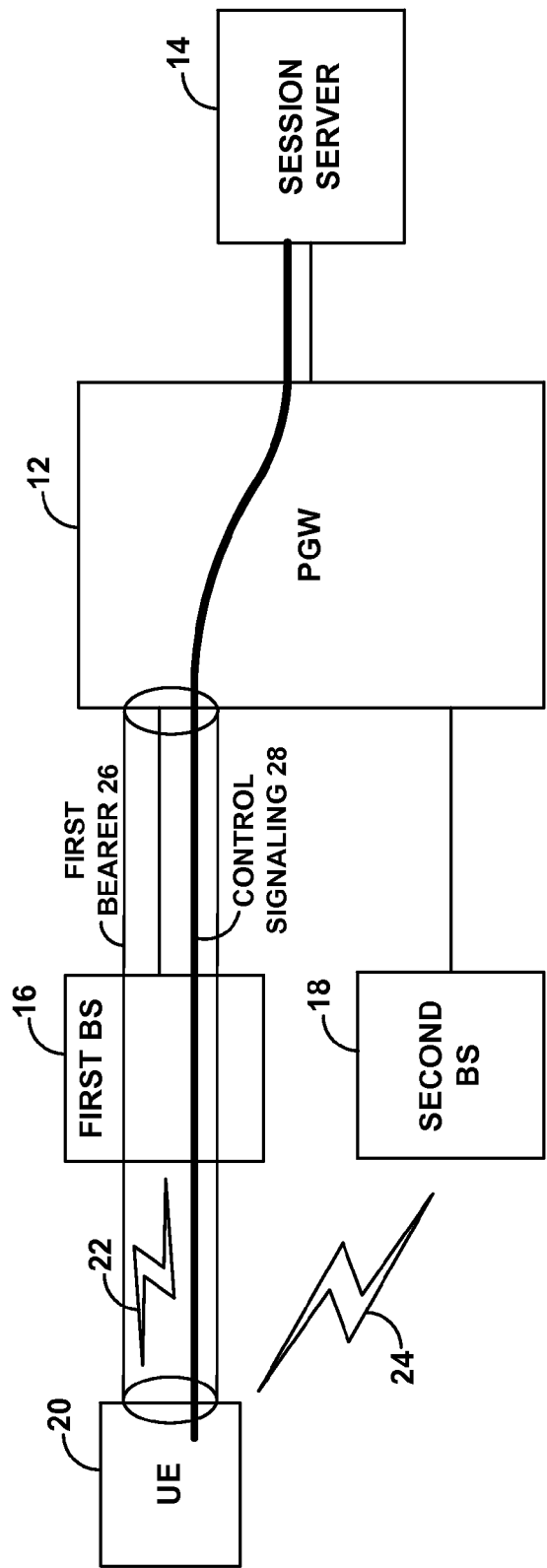
FIG. 2 is a variation of the arrangement of FIG. 1, showing a first bearer connection and session signaling path via a first base station.

Turning next to FIG. 2, one such bearer 26 is shown extending between the UE and the PGW via base station 16 and air interface 22. As noted above, this bearer may define a logical communication path through which the UE may engage in packet-data communications with various entities to which the PGW provides connectivity.

By way of example, the bearer could be a signaling bearer through which the UE can engage in signaling with session server 14. Through such a bearer, as shown, the UE may thus engage in session setup signaling with the session server to set up a media session between the UE and the session server, as represented by the bold line 28 shown passing bearer 26 and via PGW 12 between the UE and the session server. For instance, if the session server is an IMS, bearer 26 could be an IMS signaling bearer, and the UE might engage in SIP signaling with the IMS via that bearer to facilitate setup of a VoIP call or other packet-based real-time media session extending between the UE and the IMS (e.g., a call leg between the UE and a call server of the IMS), whether initiated by the UE or by the IMS.

In this arrangement, however, the UE may also detect that it is within coverage of the second base station 18, while the UE is still within coverage of the first base station 16. This may happen, for instance, when the UE already has its established bearer 26 via the first base station 16 and the UE moves into coverage of the second base station 18, or in other situations. In practice, for example, if base station 18 is a small cell, it may provide coverage in a small region within the broader coverage of base station 16. Thus, the UE might move within coverage of base station 16 to a point where the UE enters into coverage of base station 18, and the UE may then detect a pilot or reference signal of sufficient strength from base station 18 while the UE is still within good coverage of base station 16.

In this scenario, the UE may report that it is within coverage of the second base station 18, and PGW 12 may receive a notification that indicates the UE is in such coverage and is thus accessible via the second base station 18. By way of example, upon detecting coverage of the second base station 18, the UE may transmit to its serving base station, base station 16, a report that the UE is now within coverage of the second base station 18, and the base station 16 and/or supporting network infrastructure may confirm that the second base station 18 is legitimate and may direct the UE to attach with the second base station. In response, the UE may then engage in an attach process as discussed above, which may result in signaling to the PGW that notifies the PGW that the UE is now accessible via the second base station. Such notification to the PGW could, for instance, might not expressly refer to the second base station but might generally notify the PGW that the UE is accessible via a second path, which happens to be via the second base station. The PGW may then store a record indicating that the UE is so accessible.

In turn, when the UE engages in session setup signaling, via the first bearer, with the session server to set up a media session, the network may advantageously make use of the UE's accessibility via the second base station 18 to arrange for communication of media content of the session via that second base station rather than via the first base station. In particular, the network may establish for the UE a second bearer extending between the UE and the PGW via the second base station, for use to carry media content of the session, while maintaining the first bearer between the UE and the first base station for use to carry control signaling such as further SIP signaling for the session.

Figure 3:
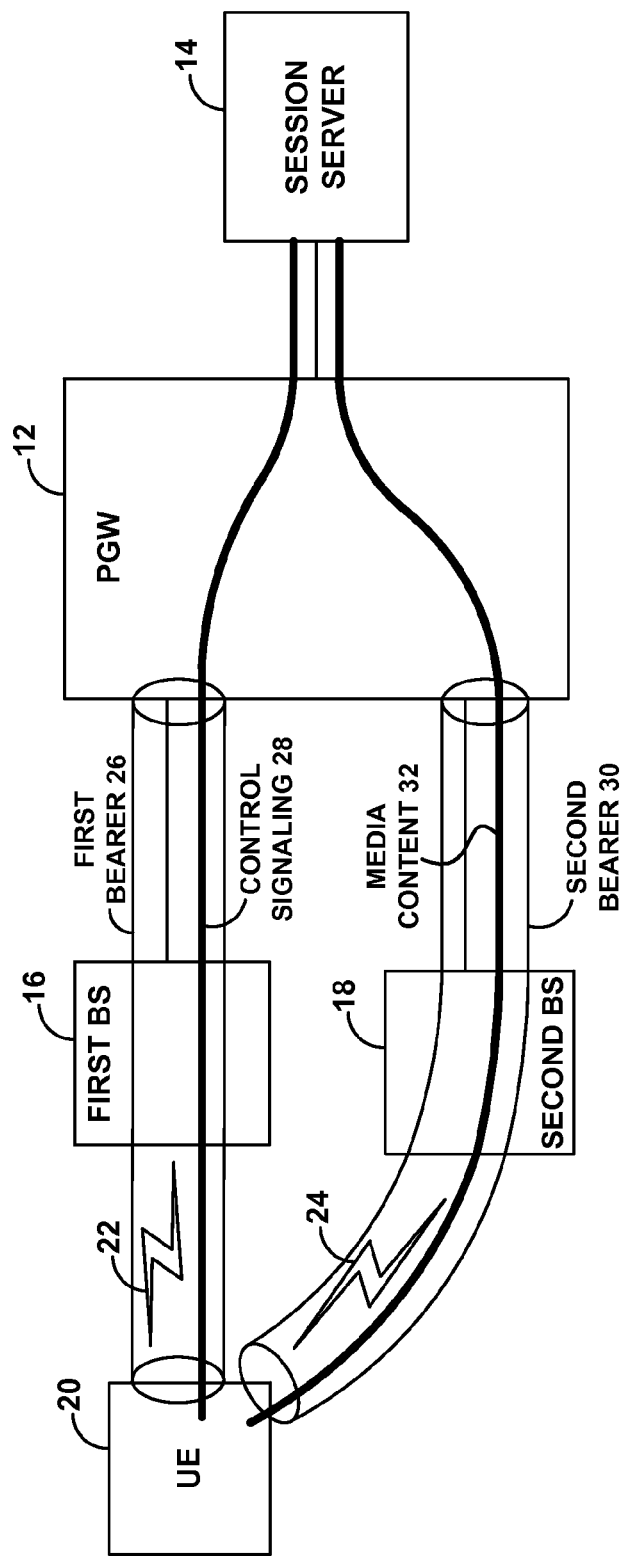
FIG. 3 is another variation of the arrangement of FIG. 1, showing a first bearer connection and signaling path via a first base station, and a second bearer connection and signaling path via a second base station.

FIG. 3 depicts the resulting arrangement by way of example. As shown in FIG. 3, the network has established for the UE a second bearer 30 that extends between the UE and the PGW via the second base station 18, for use to carry media content of the session that the UE and session server set up via the first bearer, while maintaining the first bearer 26 via the first base station for carrying control signaling for the session. By way of example, if the session server is an IMS as discussed above, and the UE engages in SIP signaling with the IMS via the first bearer 26 to set up a VoIP call, the network may establish the second bearer 30 via the second base station 18 for carrying VoIP data of the call, but the network may maintain the first bearer 26 via the first base station 16 for carrying any further SIP control signaling for VoIP call, such as signaling to modify or end the call when appropriate.

With this arrangement, the network may thereby avoid using resources of the first base station 16 and the first air interface 22 to carry the actual media content (e.g., VoIP data) of the UE's session with the session server, but may still maintain control over the session by having control signaling for the session pass between the UE and the session server through the first bearer.

Figure 4:
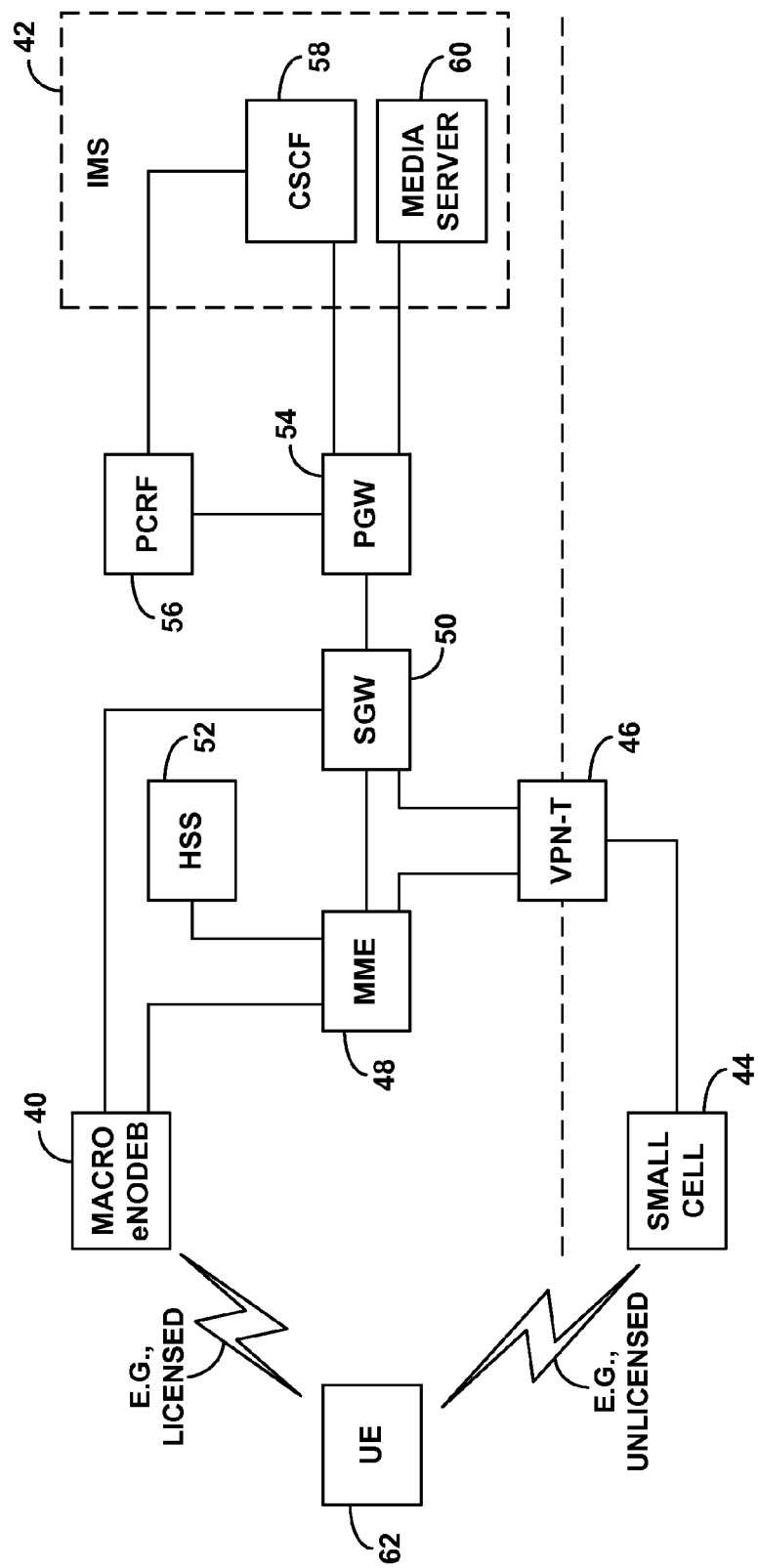
FIG. 4 is a simplified block diagram of an particular network arrangement in which features of the present disclosure can be implemented.

The arrangement shown in FIGS. 1-3 can generally represent any network system in which principles of the present disclosure can be implemented. FIG. 4 is next a somewhat more detailed, but still simplified, block diagram, depicting a specific example arrangement. In particular, the arrangement of FIG. 4 includes a representative LTE access network that serves a UE and provides connectivity with a representative IMS.

The arrangement of FIG. 4 is shown divided into two portions separated by a horizontal dashed line. The portion above the dashed line represents a wireless service provider's LTE network including a macro base station (eNodeB) 40 and other network infrastructure including or interconnected with the IMS 42. And the portion below the dashed line represents an extension of the service provider's LTE network including a small cell 44 communicatively linked with infrastructure of LTE network through a virtual private network terminator (VPN-T) 46. In this example arrangement, both the macro base station 40 and the small cell 44 may provide LTE service, and the macro base station may operate on licensed spectrum (e.g., band class 25, 26, or 41) while the small cell may operate on unlicensed spectrum (e.g., LTE Advanced at 5.7 GHz), though other example arrangements are possible as well (including possibly that the small cell could operate with WIFI or another air interface protocol rather than LTE). Further, the various connections shown in the figure may represent logical interfaces through one or more packet-switched networks.

In the arrangement shown, the macro base station 40 has an interface with an MME 48 and with an SGW 50, and the MME 48 has an interface with the SGW 50 and with a home subscriber server (HSS) 52. Further, the SGW has an interface with a PGW 54, which has an interface with a policy charging and rules function (PCRF) (policy server) 56. The IMS 42 is then includes, among possibly numerous other components (not shown), a call session control function (CSCF) 58 and a media server (such as a conference server, call server, media gateway, or the like) 60. Further, the PGW 54 has an interface with the CSCF 58 and an interface with the media server 60. And the CSCF 58 has an interface with the PCRF 56.

With this arrangement, when a representative UE 62 initially enters into coverage of the LTE network and detects coverage of macro base station 40, the UE 62 may transmit an attach request message over the air to the macro base station 40, which the macro base station 40 may forward to the MME 48. In response, the MME 48 may then engage in signaling with the HSS to authenticate the UE and perhaps to obtain service profile data for the UE. Further, the MME 48 may then engage in bearer-establishment signaling with the macro base station 40 and with the SGW 50, and the SGW 50 may in turn engage in associated signaling with the PGW 54, to set up for the UE a default Internet bearer and an IMS signaling bearer. Each of these bearers may thus extend between the UE and the PGW via the macro base station and the SGW and may have a respective tunnel ID recorded by the UE, the eNodeB, the SGW, and the PGW. Further, through the attach signaling, the PGW may assign to the UE an IP address for default Internet bearer communications and perhaps a separate IP address to use for IMS related communications.

With this arrangement, when the UE has a VoIP call to initiate or the IMS has a VoIP call to connect to the UE, SIP signaling may pass between the UE and the IMS, via the CSCF 58, to set up the VoIP call. At least some such SIP signaling would typically include Session Description Protocol (SDP) information characterizing the type of session being set up (e.g., as a VoIP call), and the CSCF 58 may read that information from the SIP signaling and responsively signal to the PCRF 56 to cause the LTE network to establish an IMS dedicated bearer for the session. When the PCRF 56 receives such signaling from the CSCF 58, the PCRF 56 may then responsively signal to the PGW 54, directing the PGW 54 to establish for the UE a dedicated IMS bearer over which the UE can communicate VoIP data with the IMS 42 (e.g., with the media server 60). Thus, the PGW 54 may then initiate bearer-establishment signaling with the SGW 50, which would result in associated signaling between the SGW 50 and the MME 48, between the MME 48 and the macro base station 40, and between the macro base station 40 and the UE 62. Through this process, an IMS signaling bearer would thus be established between the UE 62 and the PGW 54 via the macro base station 40, for carrying VoIP data between the UE and the IMS 42.

In accordance with the present disclosure, however, when the UE is attached with the macro base station 40 and has an IMS signaling bearer via the macro base station 40, the UE may detect that it is within coverage of the small cell 44. Upon detecting coverage of the small cell, the UE may then transmit to the MME 48 via the macro base station 40 a control signal reporting that the UE detected coverage of the small cell, providing a small cell identifier for instance. The MME 48 may then validate the small cell 44 and respond to the UE with a directive for the UE to attach with the small cell 44.

In response to the MME's directive, the UE may thus send an attach request message to the small cell 44, which the small cell 44 may forward via its VPN connection to the MME 48. In response, the MME 48 may then engage in associated signaling with the SGW 50, and the SGW 50 may in turn engage in associated signaling with the PGW 54. This attach signaling may function to establish for the UE a default Internet bearer via the small cell. Alternatively, the signaling could be specially configured (e.g., with using a coded tunnel ID or other messaging parameter) to simply provide notification to the SGW and PGW that the UE is now accessible via the small cell. In either case, the PGW may then record the fact that the UE is now accessible via the small cell, while maintaining a record that the UE is also accessible via the macro base station. Further, signaling may pass back ultimately as an attach accept to the UE, to complete the attach process.

Once the UE has attached with the small cell, the UE may also send a special test signal to help confirm that the UE and PGW can communicate with each other via the small cell. For instance, if the attach process established a bearer between the UE and the PGW via the small cell, the UE could send such a test signal over that bearer for receipt by the PGW and the PGW can respond to confirm that bearer data from the PGW can reach the UE via the small cell. Alternatively or additionally, the UE could send a control plane signal via the small cell to the MME, which could pass in turn to the SGW and PGW, and the PGW can respond to confirm that control signaling from the PGW can reach the UE via the small cell.

Thereafter, when a VoIP call is being set up for the UE, SIP signaling would flow between the UE and the IMS over the UE's IMS signaling bearer via the macro base station, the CSCF would signal to the PCRF, and the PCRF would signal to the PGW as discussed above. However, at this point, the PGW will note from its records that the UE is now reachable via the small cell. Therefore, instead of establishing for the UE a dedicated IMS bearer via the same base station (macro base station) through which the UE's IMS signaling bearer passes, the PGW will advantageously establish for the UE a dedicated IMS bearer via the small cell. To do this, the PGW may send a create-bearer request to the SGW but may include in the request a special flag or other parameter that the SGW would interpret as an indication that the small cell should be used for the new bearer.

Thus, when the SGW receives such a signal from the PGW, the SGW may responsively engage in associated signaling with the MME, conveying the indication that the small cell should be used for the new bearer. And the MME may then engage in signaling with the SGW and with small cell to set up for the dedicated IMS bearer a tunnel extending between the SGW and the small cell, which the small cell would extend over the air to the UE. Consequently, the network would thereby establish for the UE's VoIP call a dedicated IMS signaling bearer extending between the UE and the PGW via the small cell and the SGW, rather than via the macro base station. However, the IMS signaling bearer for the VoIP call would remain extending between the UE and the PGW via the macro base station and the SGW, rather than via the small cell.

As VoIP data then flows between the UE and the IMS, that VoIP data would thus flow via the small cell rather than via the macro base station, thus helping to conserve network resources associated with the macro base station. However, IMS control signaling for the VoIP call, such as any additional SIP signaling for the VoIP call, will flow via the macro base station rather than via the small call.

Figure 5:
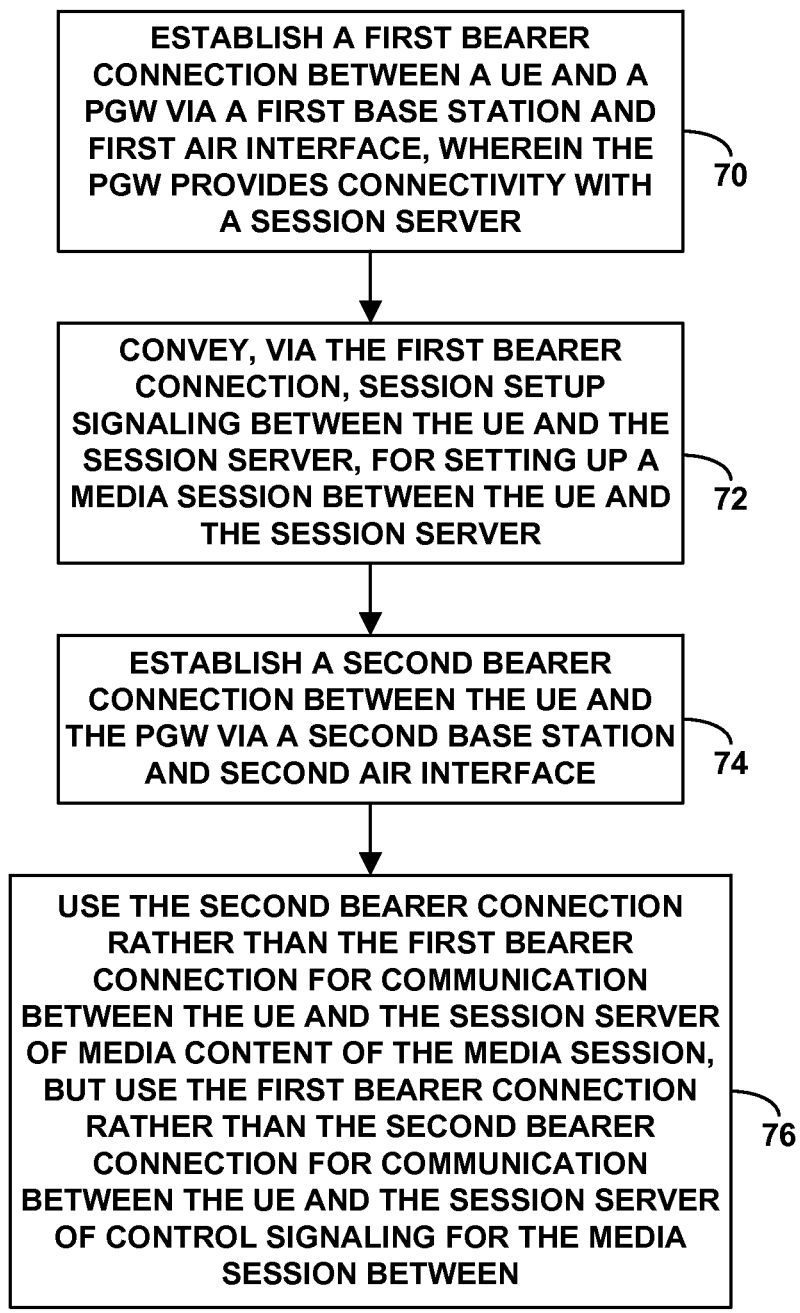
FIG. 5 is a flow chart depicting functions that can be carried out in accordance with the present disclosure.

FIG. 5 is next a flow chart depicting functions that can be carried out in accordance with the present disclosure. As shown in FIG. 5, at block 70, the functions include establishing a first bearer connection between a UE and a PGW via a first base station and first air interface, wherein the PGW provides connectivity with a session server. At block 72, the functions then include conveying, via the first bearer connection, session setup signaling between the UE and the session server (i.e., using the first bearer connection for communication of such setup signaling), for setting up a media session between the UE and the session server. And at block 74, the functions include establishing a second bearer connection between the UE and the PGW via a second base station and second air interface. Further, at block 76, the functions include using the second bearer connection rather than the first bearer connection for communication between the UE and the session server of media content of the media session, while using the first bearer connection rather than the second bearer connection for communication between the UE and the session server of control signaling for the media session between.

In line with the discussion above, the act of establishing the second bearer connection between the UE and the PGW via the second base station can occur during initiation of the packet-based real-time media session, in response to a signal indicating that the packet-based real-time media session is being set up, such as in response to a signal from a PCRF as discussed above. Further, the method can further involve the PGW receiving a notification that the UE is accessible via the second base station, in which case the act of establishing the second bearer connection between the UE and the PGW via the second base station can be in response to the received notification.

In addition, in line with the discussion above, the first bearer connection can be a first packet-data bearer connection (a bearer for carrying packet-data traffic), the second bearer connection can be a second packet-data bearer connection, and the media session can be a packet-based real-time media session. For instance, the session server can be an IMS, the first bearer connection can be an IMS signaling bearer, and the second bearer connection can be a dedicated IMS bearer. Further, the media session can be a VoIP session, the media content can be VoIP data, and the control signaling can be SIP signaling. Moreover, the first base station can be a macro base station, and the second base station can be a small-cell base station.

Figure 6:
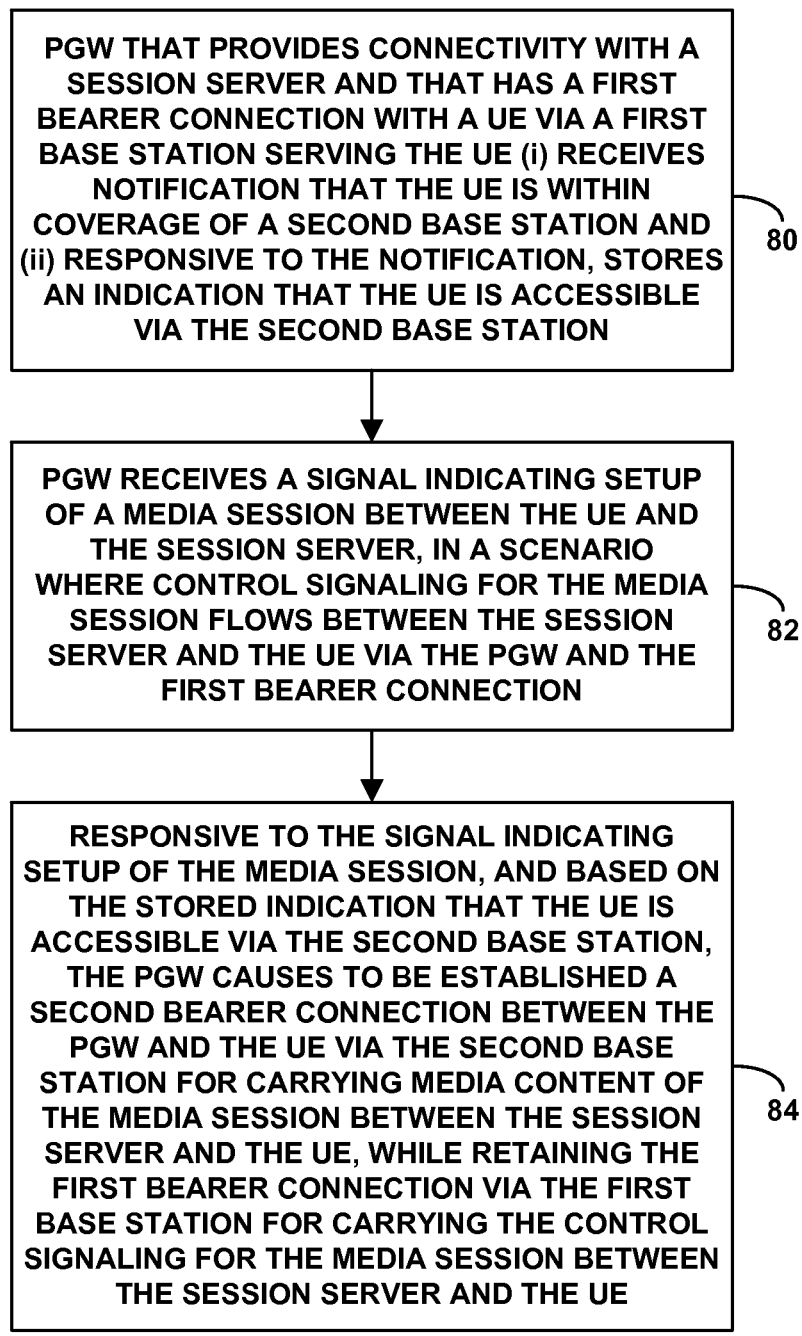
FIG. 6 is another flow chart depicting functions that can be carried out in accordance with the present disclosure.

FIG. 6 is next another flow chart depicting functions can be carried out in accordance with the present disclosure, particularly functions that can be carried out by a PGW or the like. as shown in FIG. 6, at block 80, a PGW that provides connectivity with a session server and that has a first bearer connection with a UE via a first base station serving the UE (i) receives notification that the UE is within coverage of a second base station and (ii) responsive to the notification, stores an indication that the UE is accessible via the second base station. At block 82, the PGW then receives a signal indicating setup of a media session between the UE and the session server, in a scenario where control signaling for the media session flows between the session server and the UE via the PGW and the first bearer connection. Further, at block 84, responsive to the signal indicating setup of the media session, and based on the stored indication that the UE is accessible via the second base station, the PGW causes to be established a second bearer connection between the PGW and the UE via the second base station for carrying media content of the media session between the session server and the UE, while retaining the first bearer connection via the first base station for carrying the control signaling for the media session between the session server and the UE.

Through this process as discussed above the media content of the media session may then flow between the session server and the UE via the second bearer connection rather than via the first bearer connection, but the control signaling for the media session may flow between the session server and the UE via the first bearer connection rather than via the second bearer connection.

Features of the bearer connections, session server, media session, media content, control signaling, and base stations as discussed above may apply here as well. Further, in this process, the PGW may be in communication with an SGW as discussed above, and the SGW may be in communication with an MME as discussed above. The act of receiving the notification that the UE is within coverage of the second base station may involve receiving the notification through attach signaling from the UE to the MME to the SGW to the PGW. Further, the act of the PGW causing the second bearer connection to be established for the UE may involve the PGW sending to the SGW network-initiated attach signaling that indicates the bearer should be established via the second base station, triggering further associated signaling and action as discussed above.

Moreover, the PGW may be in communication with a policy server such as a PCRF as discussed above, which may in turn be in communication with the session server. In that case, the session server may inform the policy server that the media session is being set up, and the policy server may responsively transmit to the PGW the signal indicating setup of the media session. The act of the PGW receiving the signal indicating setup of the media session may thus comprise the PGW receiving that signal from the policy server. Alternatively or additionally, the act of the PGW receiving the signal indicating setup of the media session may involve the PGW receiving at least a portion of the session setup signaling that flows between the UE and the session server via the PGW.

Figure 7:
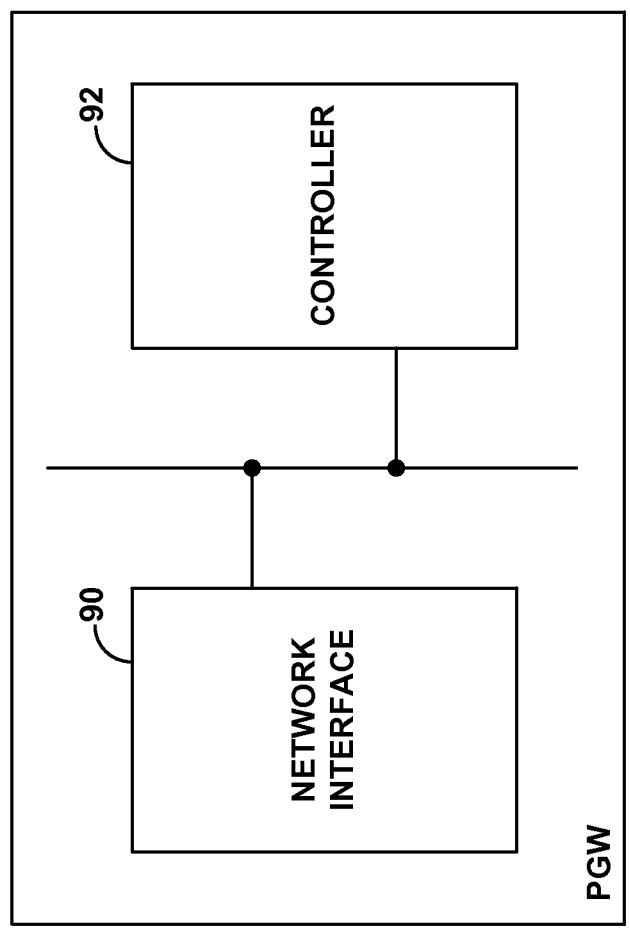
FIG. 7 is a simplified block diagram of an example PGW, depicting components that can be included in such an entity to facilitate carrying out functions of the present disclosure.

Finally, FIG. 7 is a simplified block diagram of an example PGW, showing some of the components of such an entity to facilitate carrying out various features described herein. As shown, the example PGW includes a network interface 90 through which the PGW engages in network communication, such as to facilitate providing connectivity with an IMS for instance. Further, the PGW includes a controller 92 configured to carry out the following functions when the PGW has an established IMS signaling bearer extending between the PGW and a user equipment device (UE) via a first base station serving the UE: (a) determining that the UE is also within coverage of a second base station and that a media session is being set up between the UE and the IMS and (b) responsive to the determining, causing to be established for the media session a dedicated IMS bearer between the PGW and the UE via the second base station, wherein media content for the media session then flows between the UE and the IMS via the second bearer rather than via the first bearer, but control signaling for the media session flows between the UE and the IMS via the first bearer rather than via the second bearer.

In practice, the network interface can comprise one or more network interface units, such as Ethernet network interface units, to facilitate communication with various entities as shown in the other figures and as discussed above. Further, the controller can comprise one or more general purpose processors (e.g., microprocessors) and/or one or more special purpose processors (e.g., application specific integrated circuits) as well as data storage containing program instructions executable by one or more such processors to carry out various functions described above.

In line with the discussion above, the PGW in this arrangement may function to determine that the UE is also within coverage of a second base station and that a media session is being set up between the UE and the IMS by at least (i) receiving a notification indicating that the UE is within coverage of the second base station, e.g., as part of a process of the UE attaching with the second base station and (ii) receiving from a policy server a signal indicating that the media session is being set up between the UE and the IMS, where the policy server could send the signal to the PGW in response to the policy server receiving from the IMS a corresponding signal indicating that the media session is being set up between the UE and the IMS.

Exemplary embodiments of the present invention have been described above. Those skilled in the art will understand, however, that changes and modifications may be made to these embodiments without departing from the true scope and spirit of the invention, which is defined by the claims.

We claim:

1. A method comprising:
   establishing a first bearer connection between a user equipment device (UE) and a packet data network gateway (PGW) via a first base station and first air interface, wherein the PGW provides connectivity with an Internet Multimedia Subsystem (IMS), and wherein the first bearer connection is an IMS signaling bearer;
   conveying, via the first bearer connection, session setup signaling between the UE and the IMS, for setting up a media session between the UE and the IMS;
   establishing a second bearer connection between the UE and the PGW via a second base station and second air interface, wherein the second bearer connection is a dedicated IMS bearer; and
   using the second bearer connection rather than the first bearer connection for communication between the UE and the IMS of media content of the media session, while using the first bearer connection rather than the second bearer connection for communication between the UE and the IMS of control signaling for the media session.

2. The method of claim 1, wherein establishing the second bearer connection between the UE and the PGW via the second base station occurs during initiation of the packet-based real-time media session, in response to a signal indicating that the packet-based real-time media session is being set up.

3. The method of claim 2, further comprising receiving at the PGW a notification that the UE is accessible via the second base station, wherein establishing the second bearer connection between the UE and the PGW via the second base station is further in response to the received notification.

4. The method of claim 1, wherein the first bearer connection is a first packet-data bearer connection, wherein the second bearer connection is a second packet-data bearer connection, and where the media session is a packet-based real-time media session.

5. The method of claim 1, wherein the media session is a voice over Internet Protocol (VoIP) session, wherein the media content comprises VoIP data, and wherein the control signaling comprises Session Initiation Protocol (SIP) signaling.

6. The method of claim 1, wherein the first base station is a macro base station, and wherein the second base station is a small-cell base station.

7. A method comprising:
   at a packet data network gateway (PGW) that provides connectivity with an Internet Multimedia Subsystem (IMS) and that has a first bearer connection with a user equipment device (UE) via a first base station serving the UE, (i) receiving notification that the UE is within coverage of a second base station and (ii) responsive to the notification, storing an indication that the UE is accessible via the second base station;
   receiving at the PGW a signal indicating setup of a media session between the UE and the IMS, wherein control signaling for the media session flows between the IMS and the UE via the PGW and the first bearer connection; and
   responsive to the signal indicating setup of the media session, and based on the stored indication that the UE is accessible via the second base station, the PGW causing to be established a second bearer connection between the PGW and the UE via the second base station for carrying media content of the media session between the IMS and the UE, while retaining the first bearer connection via the first base station for carrying the control signaling for the media session between the IMS and the UE,
   wherein the first bearer connection is an IMS signaling bearer, and wherein the second bearer connection is a dedicated IMS bearer,
   whereby the media content of the media session then flows between the IMS and the UE via the second bearer connection rather than via the first bearer connection, but the control signaling for the media session flows between the IMS and the UE via the first bearer connection rather than via the second bearer connection.

8. The method of claim 7, wherein the first bearer connection is a first packet-data bearer connection, wherein the second bearer connection is a second packet-data bearer connection, and where the media session is a packet-based real-time media session.

9. The method of claim 8, wherein the media session is a voice over Internet Protocol (VoIP) session, and wherein the media content comprises VoIP data.

10. The method of claim 8, wherein the control signaling comprises Session Initiation Protocol (SIP) signaling.

11. The method of claim 8, wherein the first base station is a macro base station, and wherein the second base station is a small-cell base station.

12. The method of claim 11, wherein the PGW is in communication with a serving gateway (SGW) and the SGW is in communication with a mobility management entity (MME), and wherein receiving the notification that the UE is within coverage of the second base station comprises receiving the notification through attach signaling from the UE to the MME to the SGW to the PGW.

13. The method of claim 8, further comprising the PGW receiving from the UE, via the second base station, a test signal to help confirm that the UE is reachable via the second base station.

14. The method of claim 8, wherein the PGW is in communication with a policy server that is in communication with the IMS, wherein the IMS informs the policy server that the media session is being set up, and wherein the policy server responsively transmits to the PGW the signal indicating setup of the media session, wherein receiving at the PGW the signal indicating setup of the media session comprises the PGW receiving the signal from the policy server.

15. The method of claim 8, wherein the control signaling for the media session comprises session setup signaling for initially setting up the media session, and wherein receiving the control signal indicating setup of the media session comprises receiving, as the control signal, at least a portion of the session setup signaling.

16. A packet-data-network gateway (PGW) comprising:
a network interface through which the PGW engages in network communication, wherein the PGW provides connectivity with an Internet Multimedia Subsystem (IMS); and
a controller configured to carry out the following functions when the PGW has an established IMS signaling bearer extending between the PGW and a user equipment device (UE) via a first base station serving the UE:
  determining that the UE is also within coverage of a second base station and that a media session is being set up between the UE and the IMS;
  responsive to the determining, causing to be established for the media session a dedicated IMS bearer between the PGW and the UE via the second base station, wherein media content for the media session then flows between the UE and the IMS via the second bearer rather than via the first bearer, but control signaling for the media session flows between the UE and the IMS via the first bearer rather than via the second bearer.

17. The PGW of claim 16, wherein determining that the UE is also within coverage of a second base station and that a media session is being set up between the UE and the IMS comprises:
receiving a notification indicating that the UE is within coverage of the second base station, wherein receiving the notification occurs as part of a process of the UE attaching with the second base station; and
receiving from a policy server a signal indicating that the media session is being set up between the UE and the IMS, wherein the policy server sends the signal to the PGW in response to the policy server receiving from the IMS a corresponding signal indicating that the media session is being set up between the UE and the IMS.

18. The PGW of claim 16, wherein session setup signaling to initially set up the media session flows over the first bearer.

* * * * *